United States Patent Office 3,229,481
Patented Jan. 18, 1966

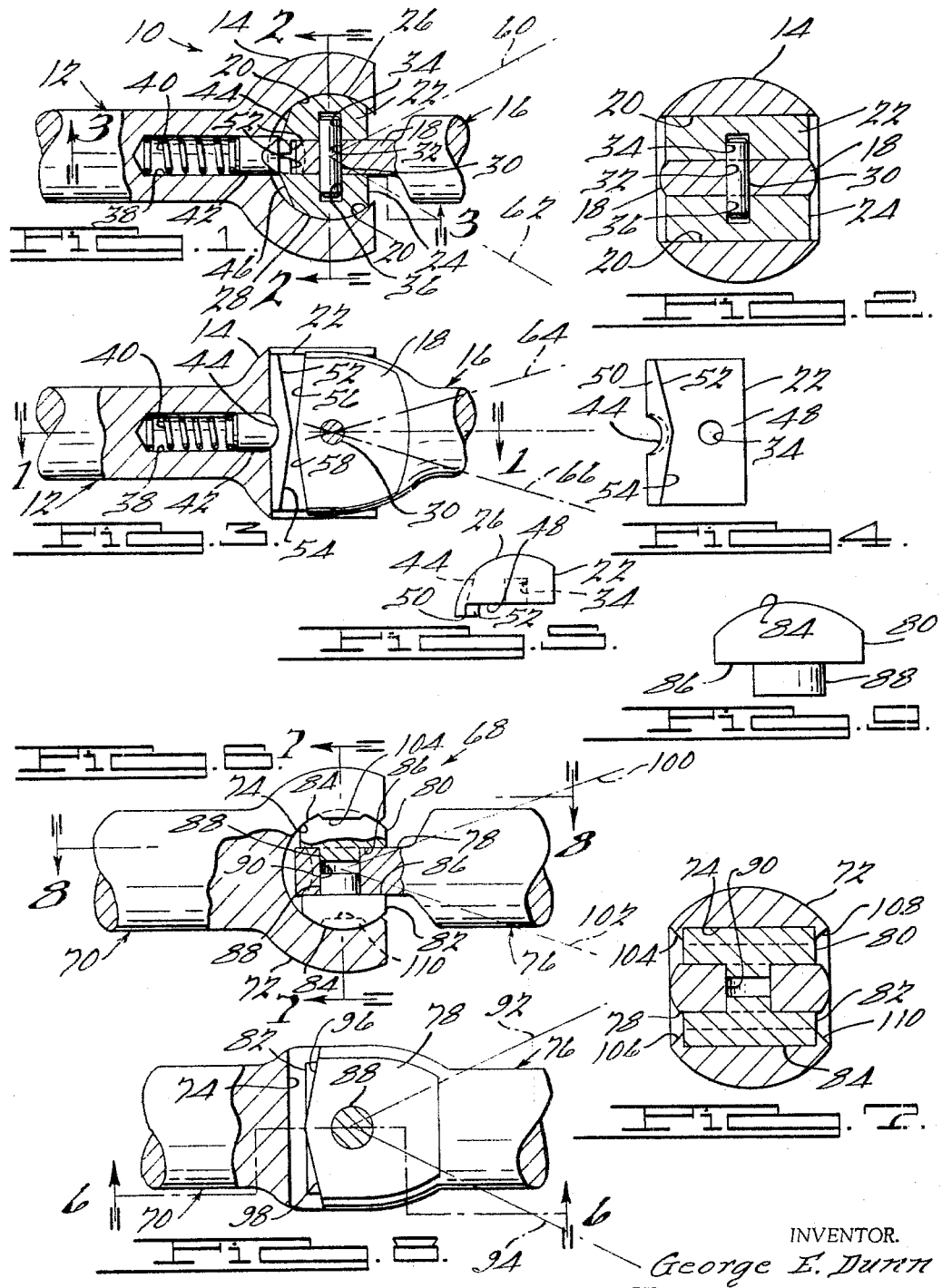

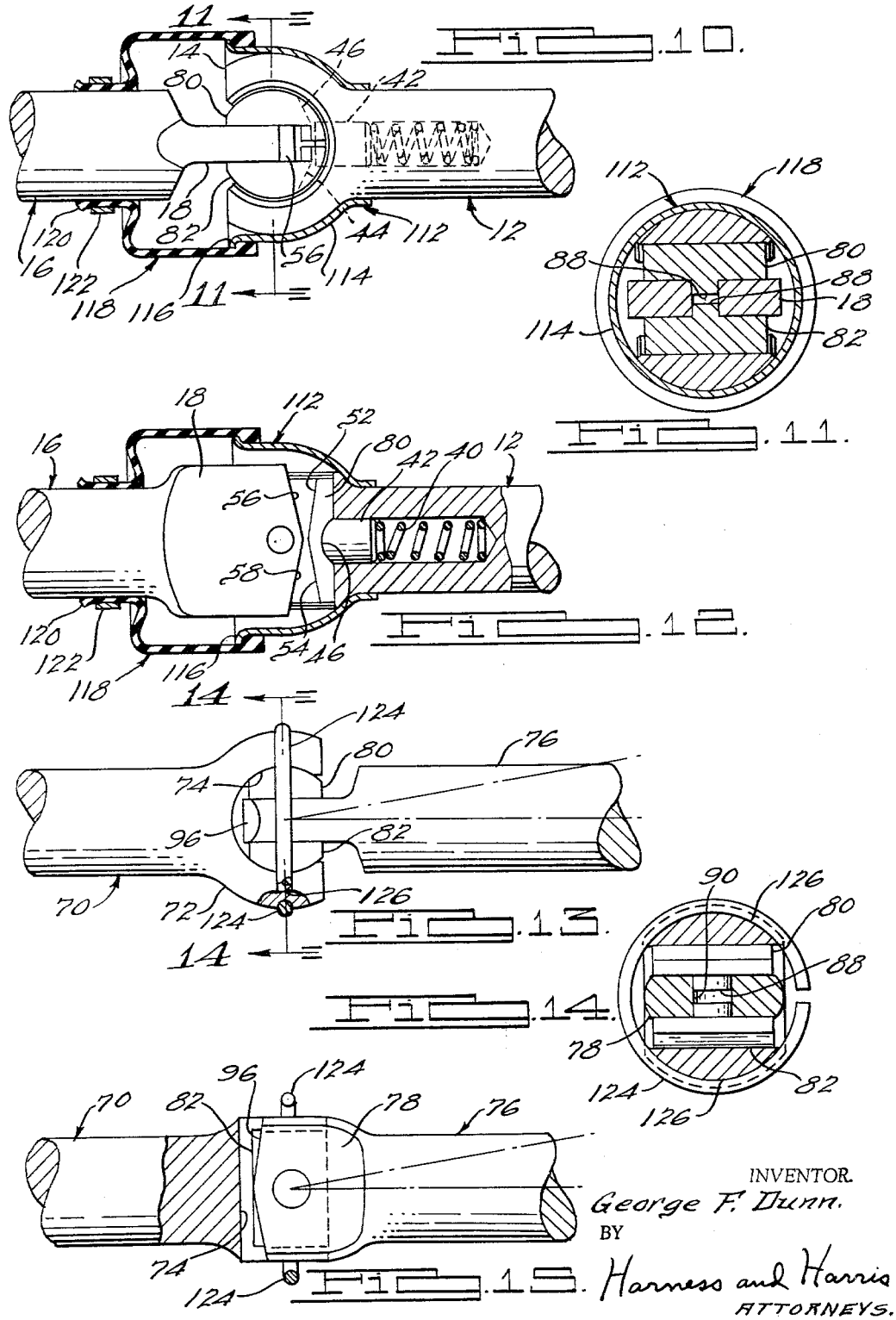

3,229,481
UNIVERSAL JOINT
George E. Dunn, Orchard Lake, Mich., assignor to Chrysler Corporation, Highland Park, Mich., a corporation of Delaware
Filed Aug. 14, 1963, Ser. No. 302,091
8 Claims. (Cl. 64—7)

This invention relates to a universal joint comprised of a driving and driven member arranged with respect to each other so as to provide a generally articulated operating drive therebetween.

Many universal joints constructed in accordance with the prior art lack sufficient working bearing areas which causes rapid wear within the joint and often contributes to the early failure thereof. Various arrangements have, heretofore, been proposed for increasing the bearing areas; however, such proposals have usually required the cooperating elements to assume configurations which are relatively difficult to produce with conventional machining processes.

Accordingly, an object of this invention is to provide a novel and improved universal joint possessing relatively large bearing surfaces.

Another object of this invention is to provide a novel and improved universal joint comprised of elements which are readily produced by conventional machining processes.

A further object of this invention is to provide a universal joint which possesses relatively large bearing surfaces provided by relatively simple elements, comprising the joint, which are readily manufactured and easily assembled to form an operating universal joint.

Other objects and advantages of this invention will become apparent when reference is made to the following description considered in conjunction with the accompanying drawing wherein:

FIGURE 1 is a longitudinal sectional view through one embodiment of the invention taken generally on the plane of line 1—1 of FIGURE 3;

FIGURE 2 is a cross-sectional view taken generally on line 2—2 of FIGURE 1;

FIGURE 3 is a sectional view taken on the plane of line 3—3 of FIGURE 1;

FIGURE 4 is a side elevational view of one of the elements comprising the invention of FIGURES 1–3;

FIGURE 5 is a top plan view of the element shown in FIGURE 4;

FIGURE 6 is a longitudinal cross-sectional view through another embodiment of the invention taken generally on the plane of line 6—6 of FIGURE 8;

FIGURE 7 is a cross-sectional view taken on the plane of line 7—7 of FIGURE 6;

FIGURE 8 is a sectional view taken substanially on the plane of line 8—8 of FIGURE 6;

FIGURE 9 is a somewhat enlarged view of one of the elements comprising the invention as illustrated by FIGURES 6–8; and FIGURES 10–15 are views similar to FIGURES 1, 2, 3, 6, 7 and 8, respectively, illustrating further modifications of the invention.

Referring now in greater detail to the drawings, FIGURE 1 illustrates a universal joint comprised of a shaft member 12 provided with a yoke portion 14 which is operatively connected to a second shaft 16 which is provided with a tang 18. Either of shafts 12 or 16 may of course be the drive member.

Yoke 14 is machined, as for example by broaching, in order to form an inner cylindrical surface 20. Individual shoe members 22 and 24 having complementary cylindrical surfaces 26 and 28 formed respectively thereon are slidably received within cylindrical surface 20. A pivot pin 30 received transversely through an aperture 32 formed in tang 18 has its opposite ends retained within apertures 34 and 36 formed in shoes 22 and 24, respectively.

A counterbore 38, formed in shaft 12, is adapted to receive therein a spring 40 and detent or key 42. Key 42 is continually urged by spring 40 into recesses 44 and 46, of annular cross-section, formed respectively in shoes 22 and 24.

Each of the shoes 22 and 24, as illustrated by shoe 22 of FIGURES 4 and 5, is provided at its inner surface 48 with a protruding portion 50 having generally vertically disposed surfaces 52 and 54 angularly disposed with respect to each other. Preferably, the extreme end of tang 18 is also provided with vertically inclined surfaces 56 and 58. Shoes 22 and 24 are preferably formed of sintered metal which is impregnated with a suitable lubricant.

Relative angular movement of shafts 12 and 16, as illustrated generally by the centerlines 60 and 62, is permitted by the cooperating cylindrical surfaces 20, 26 and 28 whereas relative angular movement as depicted by centerlines 64 and 66 of FIGURE 3 is made possible by pivot pin 30 and the apertures formed in the shoes 22, 24 and tang 18.

It should be noted that the angular displacement of the respective shafts, as viewed in FIGURE 3, is limited by the coaction of surfaces 52 and 54 with surfaces 56 and 58, respectively. That is, when the shafts 12 and 16 attain a predetermined angular relationship with respect to each other, as for example a position indicated by centerline 64, surfaces 52 and 56 abut against each other thereby effectively preventing further angular displacement in that plane. Likewise, relative angular displacement in the plane of FIGURE 1 is effectively limited by the yoke portion 14.

Referring to FIGURE 1, as shaft 16 is rotated clockwise, spring 40 continually urges key 42 against the annular recess 46; also as shaft 16 is rotated counter-clockwise key 42 is maintained in engagement with recess 44. Accordingly, key 42 continuously maintains shoes 22 and 24 in engagement with surface 20, so as to compensate for any possible wear therebetween and at the same time inhibits relative axial motion between the shoes and the cylindrical surface 20.

FIGURES 6 through 9 illustrate a second embodiment of a universal joint 68 constructed in accordance with the invention as being comprised of a shaft 70 provided with a yoke portion 72 having a cylindrical opening 74 formed therethrough, as by broaching. A second shaft 76 has a tang 78 formed at one end thereof received generally within said cylindrical opening 74 and retained therein as by oppositely disposed shoes 80 and 82.

Each of the shoes is provided with an outwardly directed complementary cylindrical surface 84, which coacts with the cylindrical surface 74 to permit relative angular displacement of shafts 70 and 76 in the plane of FIGURE 6, and inwardly directed surfaces 86 which serve to confine tang 78 therebetween. Each of the shoes, as also shown in FIGURE 9, are provided with a cylindrical projection 88 extending from the inner surface 86 which when received in aperture 90 formed in tang 78 cooperate to serve as a pivot.

Relative angular movement between shafts 70 and 76, as indicated generally by centerlines 92 and 94 of FIGURE 8, is limited by abutment of the internal cylindrical surface 74 and one of the generally vertically directed surfaces 96 and 98 formed on the end of tang 78. Also, similar to the embodiment of FIGURE 1, relative angular displacement of the shafts 70 and 76, as indicated generally by the centerlines 100 and 102 of FIGURE 6, is limited as by the abutment of tang 78 against the yoke portion 72.

Bearing shoes 80 and 82 are preferably formed of sintered metal and impregnated with a suitable lubricant. In addition to providing relatively large bearing surfaces, shoes 80 and 82 present another important advantage. That is, shoes are substantially identical to each other thereby permitting the use thereof on either side of tang 78. Relative movement of the shoes 80 and 82 axially of the cylindrical surface 74 is effectively prevented by means of abutment portions 104, 106, 108 and 110 formed as by staking of the yoke portion 72.

FIGURES 10–15 illustrate further modifications of the invention. Elements which are like or similar to those of FIGURES 1–9 are identified with like reference numbers.

The modification of FIGURES 10–12 illustrates the universal joint as being provided with a cup-like retainer or reinforcing member 112 having a portion 114 of generally spherical configuration which closely receives a portion of shaft 12 and yoke 14. The cup-like member 112 being a single continuous piece serves to absorb some of the forces incurred during operation and to a great extent prevent separation of the yoke 14 as might occur during periods of heavy load transmission through the joint.

Further, a generally radially extending lip 116 formed on a retainer 112 serves to hold one end of a generally tubular seal 118 which, preferably, has its other end 120 secured about shaft 16 as by a suitable strap 122.

The embodiment of FIGURES 13, 14 and 15, instead of being staked portions 104, 106, 108 and 110, is provided with a resilient snap ring 124 received in an arcuate groove 126 formed generally about the outer surface of yoke 72. Snap ring 124 is, of course, a means for preventing undesirable relative movement of shoes 80 and 82 axially of the cylindrical bearing opening 74.

In addition to the various embodiments and modifications of the invention disclosed and described it is apparent that other embodiments and modifications of the invention are possible within the scope of the appended claims.

I claim:

1. A universal joint comprising drive member and a driven member, one of said members having formed thereon a yoke portion with a cylindrical opening formed therethrough, the other of said members having formed thereon a tang portion received generally within said cylindrical opening, first and second shoe members respectively received between opposite sides of said tang and said cylindrical opening, pivot means operatively joining said tang and said shoe members for enabling rotative motion of said other member about the axis of said pivot means in a plane passing generally through the axis of said cylindrical opening, and resilient means carried by said one member resiliently urging at least one of said shoe members into engagement with the surface of said cylindrical opening.

2. A universal joint comprising a drive member and a driven member, one of said members having formed thereon a yoke portion with a cylindrical opening formed therethrough, the other of said members having an end portion received generally within said cylindrical opening, first and second shoe members respectively received between opposite sides of said end portion and said cylindrical opening, pivot means received within said end portion and carried by said shoe members for enabling rotative motion of said other member about said pivot means in a plane passing generally through the axis of said cylindrical opening, a key-receiving slot formed in said shoe members, and resilient means carried by said one member adapted to be in engagement with said slot for resiliently urging at least one of said shoe members into engagement with the surface of said cylindrical opening.

3. In a universal joint having a drive member and a driven member, a yoke portion formed on one of said members having a cylindrical opening formed therethrough receiving therein one end of the other of said members, and pivot means extending through said one end having an axis generally transverse to the axis of said cylindrical opening, first and second shoe members respectively received between opposite sides of said one end and the surfac of said cylindrical opening, each of said shoe members being formed to have a complementary surface engaging the surface of said cylindrical opening, an aperture formed in each of said shoe members for receiving an end of said pivot means, and abutment surfaces formed on each of said shoe members in substantial alignment with each other and disposed as to be in general juxtaposition to cooperating abutment surfaces formed on said one end in order to limit relative angular displacement between said drive member and driven member.

4. In a universal joint having a drive member and a driven member, a yoke portion formed on one of said members having a cylindrical opening formed therethrough receiving therein one end of the other of said members, and pivot means extending through said one end having an axis generally transverse to the axis of said cylindrical opening, first and second shoe members respectively received between opposite sides of said one end and the surface of said cylindrical opening, each of said shoe members being formed to have a complementary surface engaging the surface of said cylindrical opening, an aperture formed in each of said shoe members, abutment surfaces formed on each of said shoe members in substantial alignment with each other and disposed as to be in general juxtaposition to cooperating abutment surfaces formed on said one end in order to limit relative angular displacement between said drive member and driven member, and a recess formed in said shoe members adapted to receive resilient means carried by said one member for resiliently urging said shoe members into engagement with the surface of said cylindrical opening.

5. An arrangement for universally journalling a drive member to a driven member, comprising a cylindrical bearing opening formed through one of said members, separate bearing elements having cylindrical surfaces formed thereon received and journalled within said bearing opening for rotative motion about the axis of said cylindrical bearing opening, a pivot received through one end of the other of said members and retained within apertures formed in said bearing elements for enabling rotative motion of said other member generally about an axis transverse to the axis of said cylindrical bearing opening, abutment means carried by said bearing elements for at times abuttably engaging said one end of said other member in order to limit the rotation of said other member about said transverse axis, and detent means for resiliently restraining relative axial movement between said bearing elements and said cylindrical bearing opening.

6. An arrangement for universally journalling a drive member to a driven member, comprising a cylindrical bearing opening formed through one of said members, separate bearing elements having cylindrical surfaces formed thereon received and journalled within said bearing opening for rotative motion about the axis of said cylindrical bearing opening, a pivot received through one end of the other of said members and retained within apertures formed in said bearing elements for enabling rotative motion of said other member generally about an axis transverse to the axis of said cylindrical bearing opening, and abutment means carried by said bearing elements for at times abuttably engaging said one end of said other member in order to limit the rotation of said other member about said transverse axis.

7. In a universal joint having a drive member and a driven member, a yoke portion formed on one of said members having a cylindrical opening formed therethrough receiving therein one end of the other of said members, and pivot means extending through said one end having an axis generally transverse to the axis of said cylindrical opening, first and second shoe members respectively received between opposite sides of said one end and the surface of said cylindrical opening, each of said shoe members being formed to have a complementary surface engaging the surface of said cylindrical opening, an aperture formed in each of said shoe members for receiving an end of said pivot means, abutment surfaces formed on each of said shoe members in substantial alignment with each other and disposed as to be in general juxtaposition to cooperating abutment surfaces formed on said one end in order to limit relative angular displacement between said drive member and driven member, a cup-like reinforcing member carried by said yoke portion for restraining any tendency of said yoke portion to deform due to the occurrence of excessive forces being transmitted therethrough, and a tubular seal secured at one end about said reinforcing member and secured at its other end about said other member.

8. A universal joint comprising a drive member and a driven member, a yoke portion formed on one of said members having a cylindrical opening formed therethrough receiving therein one end of the other of said members, first and second shoe members respectively received between opposite sides of said one end and the surface of said cylindrical opening; each of said shoe members being formed to have a complementary surface engaging the surface of said cylindrical opening, pivot means having an axis generally transverse to the axis of said cylindrical opening operatively joining said one end to said shoe members, generally vertically directed first and second abutment portions formed respectively on said first and second shoe members and projecting towards each other so as to be in general juxtaposition with each other, each of said abutment portions having formed thereon converging abutment surfaces each of said surfaces being slightly inclined from the vertical, additional abutment surfaces formed on said one end adapted for alternate engagement with said converging abutment surfaces, a generally horizontally extending recess formed in each of said shoe members, a chamber formed in said yoke portion, a compression spring received within said chamber, and a key member slidably received within said chamber and urged by said spring against said recess in order to urge said shoe members into engagement with the surface of said cylindrical opening and to restrain relative axial movement between said shoe members and said cylindrical opening.

References Cited by the Examiner
UNITED STATES PATENTS

| | | | |
|---|---|---|---|
| 2,117,706 | 5/1938 | Cutting | 64—7 |
| 2,118,028 | 5/1938 | Biggert | 64—6 |
| 2,153,093 | 4/1939 | Magee et al. | 64—7 |
| 2,365,552 | 12/1944 | Hill. | |
| 2,625,018 | 1/1953 | Dunn. | |

FOREIGN PATENTS

| | | |
|---|---|---|
| 284,462 | 2/1928 | Great Britain. |
| 875,545 | 8/1961 | Great Britain. |

BROUGHTON G. DURHAM, *Primary Examiner.*
ROBERT C. RIORDON, *Examiner.*